(12) United States Patent
Sundarraman et al.

(10) Patent No.: US 9,705,935 B2
(45) Date of Patent: Jul. 11, 2017

(54) EFFICIENT INTERWORKING BETWEEN CIRCUIT-SWITCHED AND PACKET-SWITCHED MULTIMEDIA SERVICES

(75) Inventors: Chandrasekhar Therazhandur Sundarraman, San Diego, CA (US); Nikolai Konrad NepomucenoLeung, Takoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 1432 days.

(21) Appl. No.: 12/353,183

(22) Filed: Jan. 13, 2009

(65) Prior Publication Data

US 2009/0180470 A1 Jul. 16, 2009

Related U.S. Application Data

(60) Provisional application No. 61/020,982, filed on Jan. 14, 2008, provisional application No. 61/021,163, filed on Jan. 15, 2008.

(51) Int. Cl.
*H04L 12/66* (2006.01)
*H04L 29/06* (2006.01)

(52) U.S. Cl.
CPC ...... *H04L 65/1069* (2013.01); *H04L 65/1016* (2013.01); *H04L 65/80* (2013.01)

(58) Field of Classification Search
USPC ............... 370/218, 352, 353, 354, 395.52
See application file for complete search history.

(56) References Cited

U.S. PATENT DOCUMENTS

| | | | |
|---|---|---|---|
| 5,777,987 A * | 7/1998 | Adams et al. | ........ 370/336 |
| 6,577,324 B1 | 6/2003 | Palmer et al. | |
| 6,740,803 B2 | 5/2004 | Brinkman et al. | |
| 7,564,835 B1 * | 7/2009 | Grabelsky et al. | ........ 370/352 |

(Continued)

FOREIGN PATENT DOCUMENTS

| | | |
|---|---|---|
| CN | 1623308 A | 6/2005 |
| CN | 1902865 A | 1/2007 |

(Continued)

OTHER PUBLICATIONS

International Search Report and Written Opinion—PCT/US2009/030959, International Search Authority—European Patent Office—Jul. 30, 2009.

(Continued)

*Primary Examiner* — Yosef K Laekemariam

(57) ABSTRACT

Techniques for signaling a packet size limitation of a circuit-switched terminal to a packet-switched terminal during a multimedia session such as a multimedia telephony session. In one aspect, an interworking node obtains information from the circuit-switched terminal during call setup, and signals to a packet-switched terminal that another end of the telephony session is a circuit-switched terminal. In a further aspect, the interworking node signals to the packet-switched terminal a maximum packet size limitation negotiated with the circuit-switched terminal. Further techniques for the packet-switched terminal to accommodate the maximum negotiated packet size to minimize data reformatting by the interworking node are described.

35 Claims, 5 Drawing Sheets

(56) References Cited

U.S. PATENT DOCUMENTS

| | | | |
|---|---|---|---|
| 7,590,058 B1 * | 9/2009 | Cherchali | H04L 47/10 370/230 |
| 7,616,650 B2 * | 11/2009 | Conner | H04M 7/0072 370/260 |
| 2004/0057412 A1 | 3/2004 | Curcio et al. | |
| 2005/0053055 A1 * | 3/2005 | Horvath et al. | 370/352 |
| 2005/0122985 A1 * | 6/2005 | Murphy | 370/401 |
| 2010/0128715 A1 | 5/2010 | Dei et al. | |
| 2011/0161765 A1 * | 6/2011 | Oran | H04L 1/1607 714/748 |

FOREIGN PATENT DOCUMENTS

| | | | | |
|---|---|---|---|---|
| EP | 1 059815 | * | 6/1999 | H04Q 3/00 |
| EP | 1 059 815 | * | 6/2000 | H04Q 3/00 |
| EP | 1592198 A1 | | 11/2005 | |
| JP | H04316246 A | | 11/1992 | |
| JP | 5103015 | | 4/1993 | |
| JP | H11341058 A | | 12/1999 | |
| JP | 2006500841 A | | 1/2006 | |
| JP | 2006197331 A | | 7/2006 | |
| JP | 2006522518 A | | 9/2006 | |
| JP | 2007324788 A | | 12/2007 | |
| JP | 2008511193 | | 4/2008 | |
| JP | 2009525682 A | | 7/2009 | |
| RU | 2282888 C2 | | 8/2006 | |
| WO | 03027876 A1 | | 4/2003 | |
| WO | WO2004030286 A1 | | 4/2004 | |
| WO | WO2006/052176 | * | 5/2006 | H04Q 7/38 |
| WO | WO 2006052176 | * | 5/2006 | H04Q 7/38 |
| WO | WO2007040085 A1 | | 4/2007 | |

OTHER PUBLICATIONS

"Universal Mobile Telecommunications System (UMTS); IP Multimedia Subsystem (IMS); Multimedia telephony; Media handling and interaction (3GPP TS 26.114 version 7.3.1 Release 7); ETSI TS 126 114" ETSI Standards, LIS, Sophia Antipolis Cedex, France, vol. 3-SA4, No. V7.3.1, Jan. 1, 2008 (Jan. 1, 2008), XP014040657. Disc on Signaling for Improved MTSI and 3G 324M Interworking 3GPP Draft.

ETSI TS 125 212 v6.2.0; "Universal Mobile Telecommunications System (UMTS); Multiplexing and channel coding (FDD)", 3G TS 25.212 version 6.2.0 Release 6 (Jun. 2004).

3GPP TS 26.114, "Universal Mobile Telecommunications System (UMTS); IP Multimedia Subsystem (IMS); Multimedia telephony; Media handling and interaction," ETSI TS 126 114 V7.5.0, Release 7, Jul. 2008, 104 Pages.

3GPP TS 29.163, "3rd Generation Partnership Project Technical Specification Group Core Network and Terminals; Interworking between the IP Multimedia (IM) Core Network (CN) subsystem and Circuit Switched (CS) networks," V8.3.0, Release 8, May 2008, 237 Pages.

3GPP2: "Packet Switched Video Telephony Services (PSVT/MCS)", 3GPP2, C.S0055-0, Version 1.0, Dec. 2007 (Dec. 2007), XP002542622 p. 32, paragraph 8—p. 33.

Oomori et al., "Newest Technology that Makes Company Excited; Seamless Handover (VCC)." Nikkei Communication, No. 486, Japan, Nikkei Business Publications, Inc. May 15, 2007, pp. 58-63.

Taiwan Search Report—TW098101244—TIPO—May 20, 2013.

* cited by examiner

EFFICIENT INTERWORKING BETWEEN CIRCUIT-SWITCHED AND PACKET-SWITCHED MULTIMEDIA SERVICES

RELATED APPLICATIONS

This application claims priority to U.S. Provisional Application Ser. No. 61/020,982, entitled "Method and apparatus for low-latency interworking between circuit-switched and packet-switched multimedia services," filed Jan. 14, 2008, and U.S. Provisional Application Ser. No. 61/021,163, entitled "Method and apparatus for low-latency interworking between circuit-switched and packet-switched multimedia services," filed Jan. 15, 2008, the contents of which are hereby incorporated by reference in their entirety.

TECHNICAL FIELD

The disclosure relates to techniques for providing efficient, low-latency interworking between circuit-switched and packet-switched multimedia services.

BACKGROUND

Standardized multimedia services based on packet-switched Internet Protocol (IP) networks are recently being developed. For example, Multimedia Telephony Service for IP Multimedia System (MTSI), herein also referred to as Multimedia Telephony, is an IP-based multimedia telephony service being developed by the Third-Generation Partnership Project (3GPP) for mobile communications. See 3GPP TS 26.114 V7.5.0, "Technical Specification Group Services and System Aspects IP Multimedia Subsystem (IMS); Multimedia Telephony; Media handling and interaction," and 3GPP TS 29.163 V8.3.0, "Technical Specification Group Core Network and Terminals; Interworking between the IP Multimedia (IM) Core Network (CN) subsystem and Circuit Switched (CS) networks (Release 8)," hereinafter referred to as the "3GPP specification," the contents of which are herein incorporated by reference in their entirety. A "Packet switched Video Telephony (PSVT)" specification (C.S0055-A v10), the contents of which are also incorporated by reference herein in their entirety, has also been developed by the Third Generation Partnership Project 2 (3GPP2). Packet-switched multimedia telephony is expected to take advantage of the flexible data transport mechanisms afforded by the Internet Protocol (IP), while providing a user experience equivalent to or better than corresponding circuit-switched telephony services.

When sending media from a packet-switched terminal (such as a 3GPP MTSI terminal or a 3GPP2 PSVT terminal) to a circuit-switched terminal (such as a 3GPP CSVT terminal/3G-324M terminal), an interworking node such as a media gateway is called upon to perform interworking between the circuit-switched (CS) and packet-switched (PS) protocols. To deliver media packets from the PS domain, which generally exhibit wide size variation, over fixed-bandwidth CS domain channels, the media gateway may use data packet (e.g., video and/or audio) reformatting mechanisms such as re-shaping buffers, fragmentation, and re-assembly to transport the packets over the circuit switched network. During a telephony session, such reformatting mechanisms may undesirably cause the communications to violate audio-visual (lip) synchronization requirements, and/or degrade the quality of service by introducing additional end-to-end delay between the terminals.

It would therefore be desirable to provide techniques to signal to a PS terminal the maximum packet size limitations on data packets that can be transported without inefficient reformatting. It would further be desirable to provide techniques to allow the PS terminal to adjust the processing of its data packets depending on such maximum packet size limitations, so as to minimize the reformatting of data packets by the interworking node.

SUMMARY

An aspect of the present disclosure provides a method for improving the efficiency of data packet transport during a multimedia session, the method comprising: sending information from an interworking node to a packet-switched terminal, the information comprising a parameter related to a maximum packet size negotiated with another end of the multimedia session.

Another aspect of the present disclosure provides a method for improving the efficiency of data packet transport during a multimedia session, the method comprising: receiving information at a packet-switched terminal from an interworking node, the information comprising a parameter related to a maximum packet size negotiated with another end of the multimedia session.

Yet another aspect of the present disclosure provides a packet-switched apparatus for communicating during a multimedia session, the apparatus comprising: a receiver configured to receive information comprising a parameter related to a maximum packet size negotiated with another end of the multimedia session; and a transmitter configured to, in response to the received information, generate packets no greater than the maximum negotiated packet size.

Yet another aspect of the present disclosure provides a packet-switched apparatus for communicating during a multimedia session, the apparatus comprising: means for receiving information from an interworking node, the information comprising a parameter related to a maximum packet size negotiated with another end of the multimedia session.

Yet another aspect of the present disclosure provides a computer program product for improving the efficiency of data packet transport during a multimedia session, the product comprising: computer-readable medium comprising: code for causing a computer to receive information comprising a parameter related to a maximum packet size negotiated with another end of the multimedia session; and code for causing a computer to, in response to the received information, generate packets no greater than the maximum negotiated packet size.

DETAILED DESCRIPTION

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Note for ease of discussion, various exemplary embodiments of the present disclosure will be described with reference to implementations according to the 3GPP specification. However, such description is not meant to limit the techniques of the present disclosure to implementations of multimedia telephony according to the 3GPP specification. One of ordinary skill in the art may readily derive modifications to the present techniques so that they may be applied to alternative systems, e.g., systems implemented according to the 3GPP2 specification, or specifications produced by the Internet Engineering Task Force (IETF). Such alternative exemplary embodiments are contemplated to be within the scope of the present disclosure.

Figure 1:
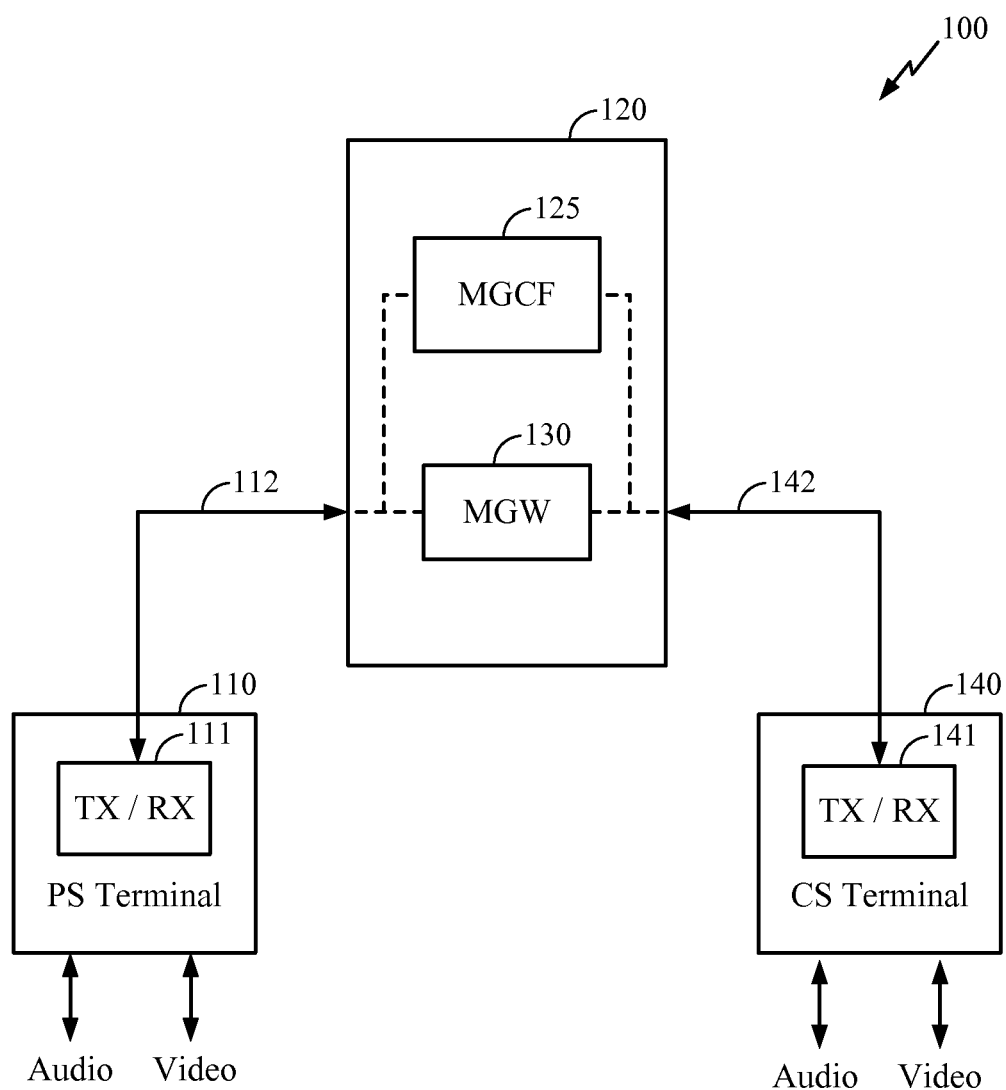
FIG. 1 depicts a system for MTSI according to the 3GPP specification.

FIG. 1 depicts a system 100 for MTSI according to the 3GPP specification. In FIG. 1, the communications system 100 includes a packet-switched (PS) terminal 110 configured to accept multimedia input from a user (not shown), and/or deliver multimedia output to the user. Such multimedia input and output may be communicated to and from other terminals during a multimedia session. In this specification and the claims, it will be understood that a multimedia session may refer to a session including one or more types of media streams. For example, a multimedia session may include both video and audio media streams, as shown in FIG. 1. Alternatively, a multimedia session may include a video stream only, an audio stream only, a text stream only, or any combination of such media streams.

The PS terminal 110 may transmit and receive multimedia data to and from an Interworking Node 120 over a PS channel 112 using transmitter and receiver module 111. Interworking Node 120 may include a Media Gateway (MGW) 130 and a Media Gateway Control Function (MGCF) 125. Transport of multimedia data to and from the PS terminal 110 over PS channel 112 includes using a transport protocol to encapsulate the media in the form of packets.

In FIG. 1, the Interworking Node 120 further communicates with a circuit-switched (CS) terminal 140 over a CS channel 142. Like the PS terminal 110, the CS terminal 140 is also configured to accept multimedia inputs from a user, and/or deliver multimedia output to the user. Unlike the PS terminal 110, however, the CS terminal 140 does not transmit and receive multimedia data in the form of packets of varying size. Rather, a CS terminal 140 uses a dedicated session over CS channel 142 which has a fixed bandwidth guaranteed to the session, and transmits and receives data over the CS channel 142 using transmitter and receiver 141.

When sending media from the PS terminal 110 to the CS terminal 140, the MGW 130 may perform interworking necessary between the PS and CS protocols. For example, during a unit of time, the dedicated CS channel may support only service data units (SDU's) that are less than a fixed maximum SDU size. However, a PS terminal 110 may generate an application layer protocol data unit (PDU) having an arbitrary size. It is thus possible that the size of the PDU generated by the PS terminal 110 may cause the corresponding SDU size to exceed the maximum SDU size of the CS channel 142.

To address this issue, the MGW 130 may fragment such a PDU prior to transmission to the CS terminal 140, for subsequent reassembly by the CS terminal 140. For further details of the fragmentation and reassembly mechanisms, see Section 12.2.4.6, "Packet size considerations," of 3GPP TS 26.114 V7.5.0, earlier referenced herein. However, such fragmentation and reassembly may undesirably cause the media communications to violate audio-visual (lip) synchronization requirements, and/or degrade quality of service by introducing additional end-to-end delay between the terminals.

According to an aspect of the present disclosure, techniques are provided for an MGW 130 to communicate packet size limitations of the CS channel 142 or CS terminal 140 to a PS terminal 110, such that a PS terminal 110 may control the size of its generated packets to best accommodate the maximum SDU size supported by the CS network. In the present disclosure, the techniques are illustrated in the context of a communications system operating according to the 3GPP specification. However, it will be understood by one of ordinary skill in the art that the techniques may be readily applied to systems operating according to other specifications. Such alternative exemplary embodiments are also contemplated to be within the scope of the present disclosure.

Figure 2:
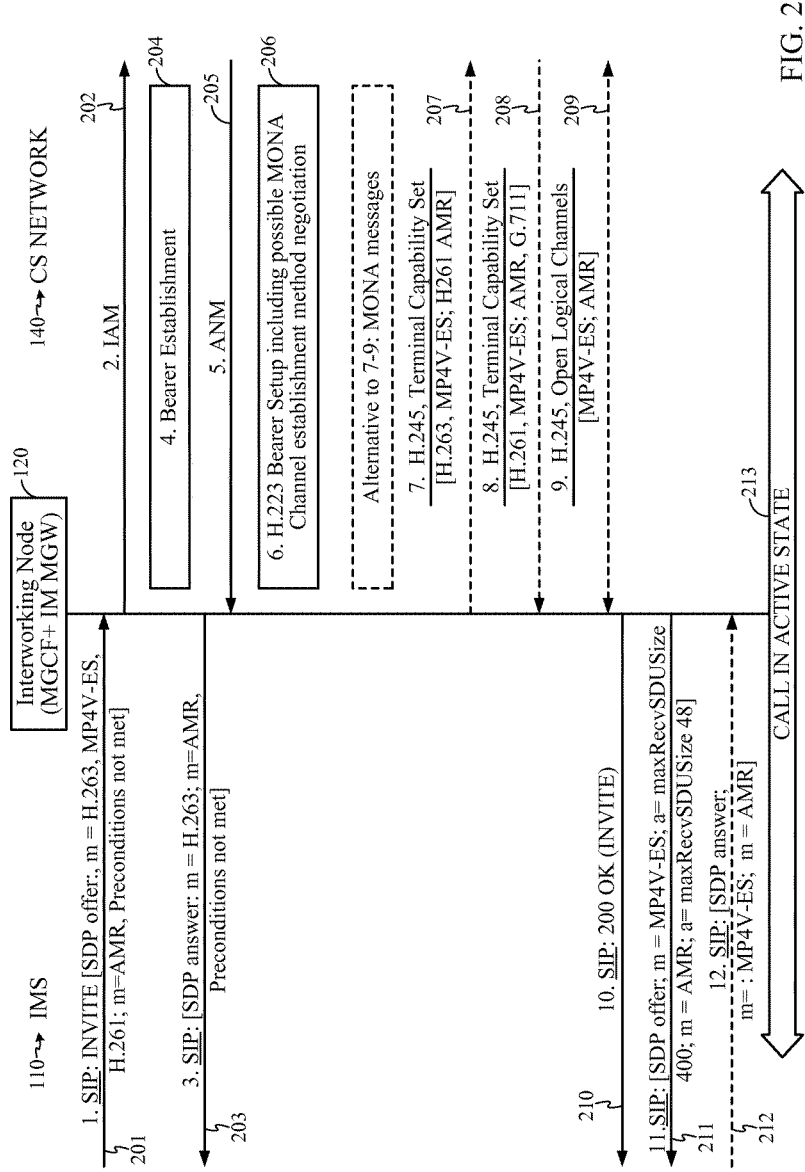
FIG. 2 depicts an exemplary embodiment of a mechanism for communicating CS terminal limitations to the PS terminal, wherein an IP Multimedia Core Network (IM CN) originates the session, and preconditions are used at the IMS side.

FIG. 2 depicts an exemplary embodiment of a mechanism for communicating CS terminal limitations to the PS terminal, wherein an IP Multimedia Core Network (IM CN) originates the session, and preconditions are used at the IMS side. Steps 201 through 210, and 212 through 213 illustrate interactions between the H.245 or MONA procedures and Session Initiation Protocol (SIP)/SDP that are well-known in the prior art. See, e.g., Figure E.2.3.1.1.1 and accompanying description in 3GPP TS 29.163 V8.3.0, earlier referenced hereinabove.

According to the present disclosure, at step 211 of the message exchanges, an "a" line following the "m" line associated with the video flow in an SDP message sent from the Interworking Node 120 to the PS terminal 110 may include an attribute "maxRecvSDUSize" having an associated numerical value maxAl2SDUSize. This attribute may indicate the maximum SDU size (e.g., in bytes) negotiated by the MGCF 125 with the CS terminal 140 for a video flow. In FIG. 2, maxAl2SDUSize has an exemplary value of 400. One of ordinary skill in the art will appreciate that while an "MP4V-ES" video codec is associated with the video flow shown in FIG. 2, other video codecs may also readily be used.

Step 211 of the message exchanges may further include specifying an attribute "maxRecvSDUSize" following the "m" line associated with the audio flow. This attribute may have an associated numerical value maxAl3SDUSize, indicating the maximum SDU size negotiated by the MGCF 125 with the CS terminal 140 for an audio flow. In FIG. 2, maxAl3SDUSize has an exemplary value of 48. Such signaling is contemplated to be within the scope of the present disclosure. One of ordinary skill in the art will appreciate that while an "AMR" audio codec is associated with the audio flow shown in FIG. 2, other audio codecs may also readily be used.

In an alternative exemplary embodiment (not shown), the "a" line in the SDP message of step 211 may further include an additional "a" attribute 3G-324M, indicating that the terminal being communicated with is a 3G-324M CS terminal.

In an exemplary embodiment, based on the values of the maxRecvSDUSize attributes signaled by the Interworking Node 120, the PS terminal 110 may optionally adapt its own packet processing to ensure that the generated SDU sizes are smaller than the signaled maximum allowed SDU size. This minimizes the fragmentation and re-assembly of data packets that needs to be performed by the Interworking Node 120. In an exemplary embodiment, the PS terminal 110 may remove the "a" attributes in succeeding SIP messages.

In an alternative exemplary embodiment, if the capability to accommodate the maxRecvSDUSize attribute is not supported by the PS terminal 110, then the PS terminal 110 may simply ignore the information signaled by the Interworking Node 120 about the CS channel's limitations, and rely on the Interworking Node 120's normal reformatting schemes to convey data to the CS terminal 140.

In an exemplary embodiment, the maximum SDU size limit to be signaled by the Interworking Node 120 may be determined by the Interworking Node 120, e.g., from the H.223 bearer capability exchange between the CS terminal 140 and the MGCF 125 (not shown). Such bearer capability exchange is well-known in the art, and will not be further described herein.

In alternative exemplary embodiments (not shown), the Interworking Node 120 may also indicate to the PS terminal 110 an SDU reception interval that may correspond to how frequently the SDU's are scheduled for delivery over the CS channel.

Figure 3:
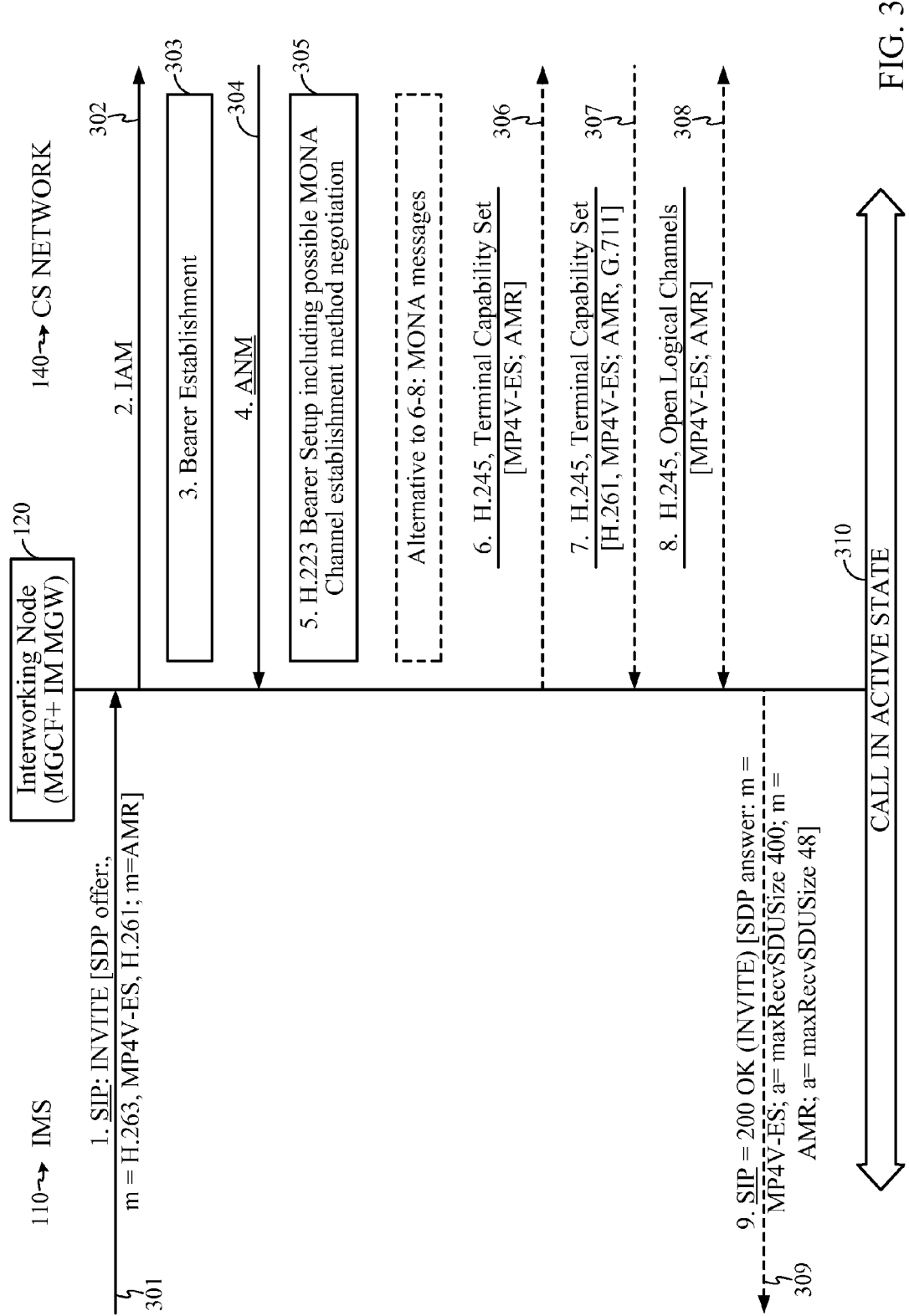
FIG. 3 depicts a further exemplary embodiment of a mechanism for communicating CS terminal limitations to the PS terminal, wherein an IM CN originates the session, and preconditions are not used at the IMS side.

FIG. 3 depicts a further exemplary embodiment of a mechanism for communicating CS terminal limitations to the PS terminal, wherein an IM CN originates the session, and preconditions are not used at the IMS side. Steps 301 through 308 illustrate procedures and Session Initiation Protocol (SIP)/SDP that are well-known in the prior art. See, e.g., Figure E.2.3.2.1.1 and accompanying description in 3GPP TS 29.163 V8.3.0, earlier referenced hereinabove. At step 309, maxRecvSDUSize parameters are signaled in accordance with the principles earlier disclosed herein, and will be clear to one of ordinary skill in the art in light of the description of FIG. 2 given hereinabove.

Figure 4:
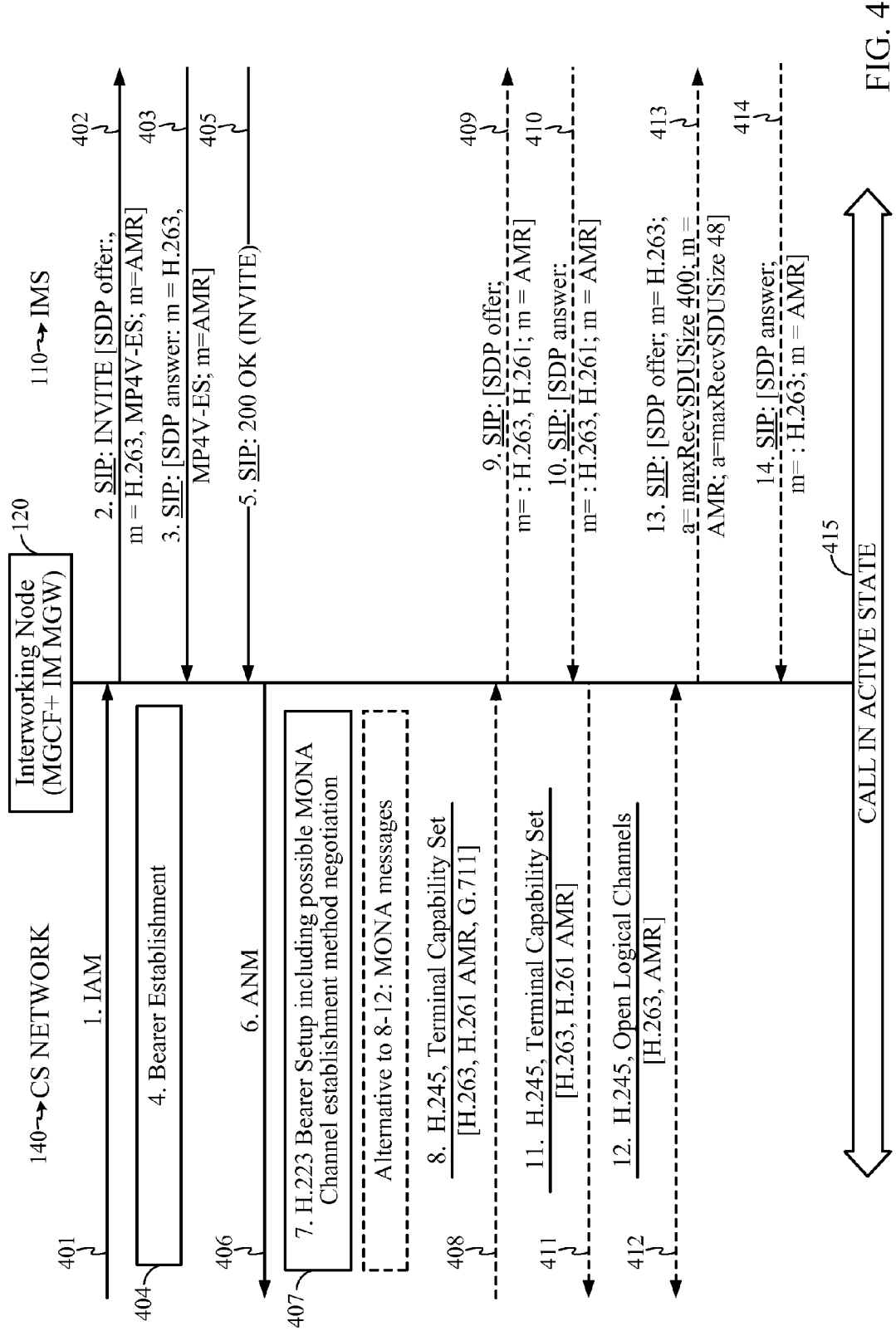
FIG. 4 depicts an exemplary embodiment of a mechanism for communicating CS terminal limitations to the PS terminal, wherein the CS network originates the session.

FIG. 4 depicts an exemplary embodiment of a mechanism for communicating CS terminal limitations to the PS terminal, wherein the CS network originates the session. Steps 401 through 412, and 414 illustrate procedures and Session Initiation Protocol (SIP)/SDP that are well-known in the prior art. See, e.g., Figure E.2.4.1.1.1 and accompanying description in 3GPP TS 29.163, V8.3.0, earlier referenced hereinabove. At step 414, maxRecvSDUSize parameters are signaled in accordance with the principles earlier disclosed herein, and will be clear to one of ordinary skill in the art in light of the description of FIG. 2 given hereinabove.

Techniques for communicating the limitations of a CS terminal to a PS terminal have been disclosed hereinabove. Further disclosed hereinbelow are techniques for a PS terminal to adjust its packet processing to adapt to the information communicated about CS terminal limitations. Note the techniques for PS terminal processing disclosed hereinbelow need not be combined with the techniques for signaling the limitations of the CS terminal disclosed hereinabove, and may be implemented separately and independently in alternative exemplary embodiments of the present disclosure.

In an exemplary embodiment, in response to being notified that the terminal being communicated with is a CS terminal, a PS terminal may adapt the choice of a packet loss feedback mechanism between the PS terminal and the MGW. For example, a PS terminal may dynamically select picture loss indication (PLI) as a preferred mechanism over other forms of packet loss feedback when the PS terminal learns that the other side is a CS terminal, as CS terminals widely operate using a PLI mechanism for packet loss feedback.

In another exemplary embodiment, in response to being notified of the maximum SDU size limits supported by the CS terminal, the PS terminal may ensure that its own generated packets stay under the maximum SDU size limits. This allows efficient packing of data packets at the MGW, as well as timely delivery of the packets to the CS terminal.

Note while exemplary embodiments of the present disclosure have been described wherein a PS terminal communicates with a CS terminal subject to the signaled packet size limitations of the CS terminal, the scope of the present disclosure is not restricted to communications between a PS terminal and a CS terminal. For example, the present techniques may generally be applied to communications between a PS terminal and any other terminal (including non-circuit switched terminals) having a maximum supported packet size. Such alternative exemplary embodiments are contemplated to be within the scope of the present disclosure.

Figure 5:
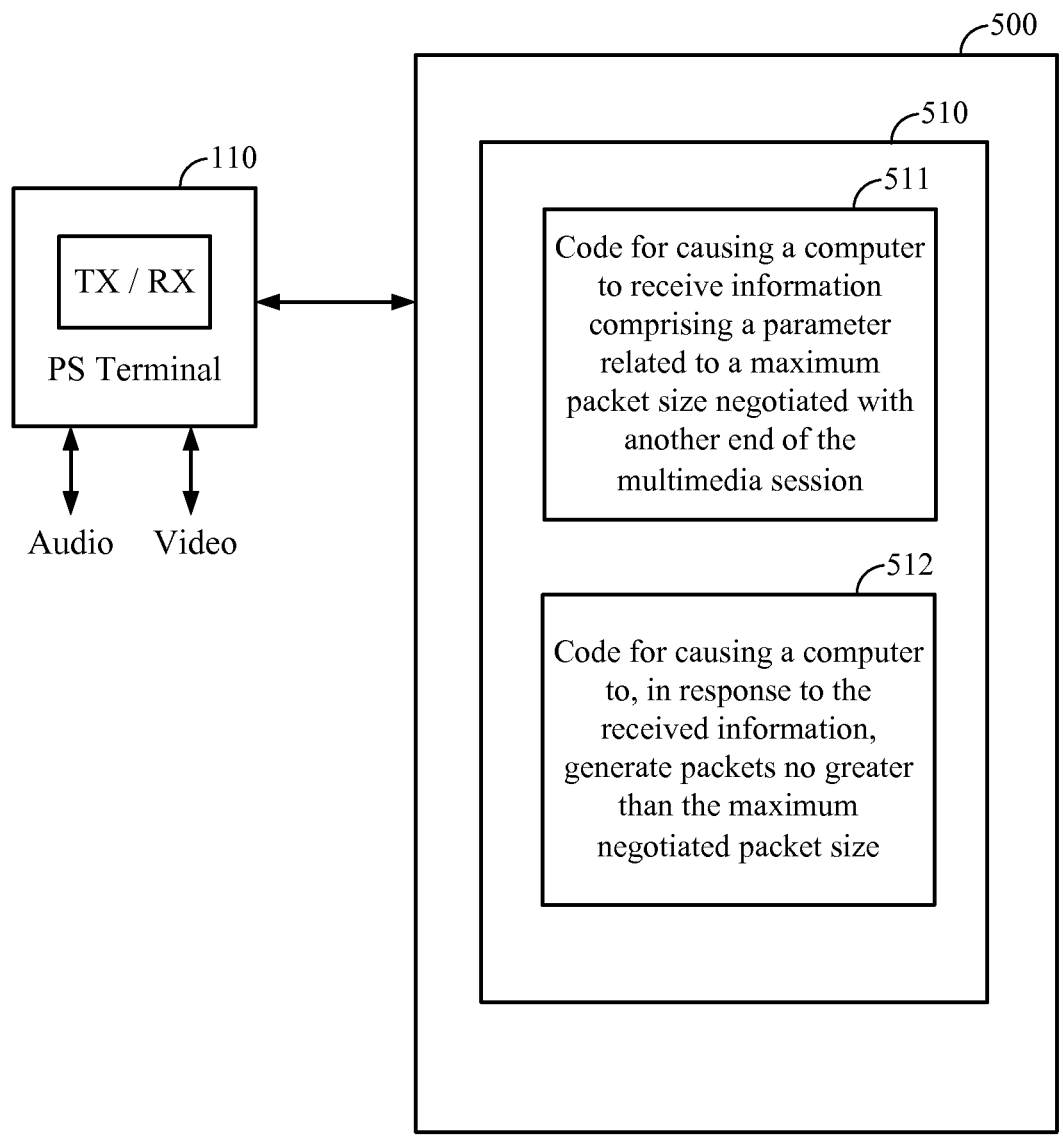
FIG. 5 depicts an exemplary embodiment of a computer program product for improving the efficiency of data packet transport during a multimedia session according to the present disclosure.

FIG. 5 depicts an exemplary embodiment of a computer program product 500 for improving the efficiency of data packet transport during a multimedia session according to the present disclosure. Note the computer program product 500 is shown for illustrative purposes only, and is not meant to restrict the scope of the present disclosure to any particular exemplary embodiment of a computer program product.

In FIG. 5, a packet-switched (PS) terminal 110 as earlier described with reference to FIG. 1 is coupled to a computer program product 500. The computer program product 500 includes computer-readable medium 510 storing code for causing a computer to perform certain functions.

In particular, the computer-readable medium 510 includes code 511 for causing a computer to receive information comprising a parameter related to a maximum packet size negotiated with another end of the multimedia session.

The computer-readable medium 510 further includes code 512 for causing a computer to, in response to the received information, generate packets no greater than the maximum negotiated packet size.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A method for data packet transport during a multimedia session, the method comprising:
   determining, by an interworking node, a maximum packet size for a video flow based on a negotiation between a media gateway control function (MGCF) of the interworking node and a circuit-switched terminal, wherein the maximum packet size is determined in part based on a bearer capability exchange between the MGCF and the circuit-switched terminal over a circuit-switched channel having a fixed bandwidth; and
   sending an SDP message from the interworking node to a packet-switched terminal, the SDP message having information comprising a parameter indicating to the packet-switched terminal the maximum packet size that can be transmitted to the circuit-switched terminal without fragmenting, at a media gateway (MGW) of the interworking node, data packets received from the packet-switched terminal prior to transmission of the data packets by the MGW to the circuit-switched terminal.

2. The method of claim 1, wherein the multimedia session is a multimedia telephony session.

3. The method of claim 1, wherein the information further comprises information notifying the packet-switched terminal that the interworking node is communicating with the circuit-switched terminal.

4. The method of claim 1, wherein the parameter indicating the maximum packet size comprises a maximum service data unit (SDU) size.

5. The method of claim 1, wherein the information further comprises a service data unit (SDU) reception interval.

6. A method for data packet transport during a multimedia session, the method comprising:

receiving at a packet-switched terminal an SDP message from an interworking node having a media gateway control function (MGCF) and a media gateway (MGW), the SDP message having information comprising a parameter indicating a maximum packet size for a video flow that can be transmitted by the interworking node to a circuit-switched terminal without fragmenting, at the MGW of the interworking node, data packets received from the packet-switched terminal, and the maximum packet size being determined at the interworking node based on a negotiation between the MGCF and the circuit-switched terminal, wherein the maximum packet size is determined in part based on a bearer capability exchange between the interworking node and the circuit-switched terminal over a circuit-switched channel having a fixed bandwidth; and generating, at the packet-switched terminal, a data packet in response to the received information.

7. The method of claim 6, wherein the multimedia session is a multimedia telephony session.

8. The method of claim 6, wherein the information further comprises information notifying the packet-switched terminal that the interworking node is communicating with the circuit-switched terminal.

9. The method of claim 8, wherein the parameter indicating the maximum packet size comprises a maximum negotiated service data unit (SDU) size.

10. The method of claim 9, wherein the information further comprises a service data unit (SDU) reception interval.

11. The method of claim 6, wherein the packet-switched terminal is a packet switched video telephony (PSVT) terminal.

12. The method of claim 6, wherein generating the data packet comprises adjusting the processing at the packet-switched terminal such that the generated data packet is not greater than the maximum packet size.

13. The method of claim 8, further comprising:
dynamically selecting, in response to the received information notifying the packet-switched terminal that the interworking node is communicating with the circuit-switched terminal, a picture loss indication (PLI) mode of packet loss feedback.

14. A packet-switched apparatus, the apparatus comprising:
a receiver configured to receive an SDP message from an interworking node having a media gateway control function (MGCF) and a media gateway (MGW), the SDP message having information comprising a parameter indicating a maximum packet size for a video flow that can be transmitted by the interworking node to a circuit-switched terminal without fragmenting, at the MGW of the interworking node, data packets received from the packet-switched apparatus, and the maximum packet size being determined at the interworking node based on a negotiation between the MGCF and the circuit-switched terminal, wherein the maximum packet size is determined in part based on a bearer capability exchange between the interworking node and the circuit-switched terminal over a circuit-switched channel having a fixed bandwidth; and
a transmitter configured to generate a data packet in response to the received information.

15. The packet-switched apparatus of claim 14, wherein the multimedia session is a multimedia telephony session.

16. The packet-switched apparatus of claim 14, wherein the information further comprises information notifying the packet-switched apparatus that the interworking node is communicating with the circuit-switched terminal.

17. The packet-switched apparatus of claim 16, wherein the receiver and the transmitter are further configured to dynamically select, in response to receiving information notifying that the interworking node is communicating with the circuit-switched terminal, a picture loss indication (PLI) mode of packet loss feedback.

18. The packet-switched apparatus of claim 16, wherein the parameter indicating the maximum packet size comprises a maximum negotiated service data unit (SDU) size.

19. The packet-switched apparatus of claim 17, wherein the information further comprises a service data unit (SDU) reception interval.

20. A packet-switched apparatus, the apparatus comprising:
means for receiving an SDP message from an interworking node having a media gateway control function (MGCF) and a media gateway (MGW), the SDP message having information comprising a parameter indicating a maximum packet size for a video flow that can be transmitted by the interworking node to a circuit-switched terminal without fragmenting, at the MGW of the interworking node, data packets received from the packet-switched apparatus, and the maximum packet size being determined at the interworking node based on a negotiation between the MGCF and the circuit-switched terminal, wherein the maximum packet size is determined in part based on a bearer capability exchange between the interworking node and the circuit-switched terminal over a circuit-switched channel having a fixed bandwidth; and
means for generating a data packet in response to the received information.

21. The packet-switched apparatus of claim 20, wherein the means for generating the data packet comprises means for adjusting a packet size of the generated data packet such that the packet size is not greater than the maximum packet size.

22. A non-transitory computer-readable storage medium for data packet transport during a multimedia session having stored thereon:
code for causing a computer to receive an SDP message at a packet-switched terminal from an interworking node having a media gateway control function (MGCF) and a media gateway (MGW), the SDP message having information comprising a parameter indicating a maximum packet size for a video flow that can be transmitted by the interworking node to a circuit-switched terminal without fragmenting, at the MGW of the interworking node, data packets received from the packet-switched terminal, and the maximum packet size being determined at the interworking node based on a negotiation between the MGCF and the circuit-switched terminal, wherein the maximum packet size is determined in part based on a bearer capability exchange between the interworking node and the circuit-switched terminal over a circuit-switched channel having a fixed bandwidth; and
code for causing the computer to generate a data packet in response to the received information.

23. An apparatus for data packet transport during a multimedia session, comprising:
a processor;
a memory in electronic communications with the processor, the memory embodying instructions, the instructions being executable by the processor to:

determine, by an interworking node, a maximum packet size for a video flow based on a negotiation between a media gateway control function (MGCF) of the interworking node and a circuit-switched terminal, wherein the maximum packet size is determined in part based on a bearer capability exchange between the MGCF and the circuit-switched terminal over a circuit-switched channel having a fixed bandwidth; and send an SDP message from the interworking node to a packet-switched terminal, the SDP message having information comprising a parameter indicating to the packet-switched terminal the maximum packet size that can be transmitted to the circuit-switched terminal without fragmenting, at a media gateway (MGW) of the interworking node, data packets received from the packet-switched terminal prior to transmission of the data packets by the MGW to the circuit-switched terminal.

24. The apparatus of claim 23, wherein the multimedia session is a multimedia telephony session.

25. The apparatus of claim 23, wherein the parameter indicating the maximum packet size comprises a maximum service data unit (SDU) size.

26. The apparatus of claim 23, wherein the information further comprises a service data unit (SDU) reception interval.

27. The apparatus of claim 23, wherein the instructions are further executable by the processor to fragment, at the interworking node, a data packet received from the packet-switched terminal that exceeds the maximum packet size.

28. A non-transitory computer-readable medium for data packet transport having stored thereon:
code for causing a computer to determine, by an interworking node, a maximum packet size for a video flow based on a negotiation between a media gateway control function (MGCF) of the interworking node and a circuit-switched terminal, wherein the maximum packet size is determined in part based on a bearer capability exchange between the MGCF and the circuit-switched terminal over a circuit-switched channel having a fixed bandwidth; and
code for causing the computer to send an SDP message from the interworking node to a packet-switched terminal, the SDP message having information comprising a parameter indicating to the packet-switched terminal the maximum packet size that can be transmitted to the circuit-switched terminal without fragmenting, at a media gateway (MGW) of the interworking node, data packets received from the packet-switched terminal prior to transmission of the data packets by the MGW to the circuit-switched terminal.

29. The non-transitory computer-readable medium of claim 28, wherein the multimedia session is a multimedia telephony session.

30. The non-transitory computer-readable medium of claim 28, wherein the parameter indicating the maximum packet size comprises a maximum service data unit (SDU) size.

31. The non-transitory computer-readable medium of claim 28, wherein the information further comprises a service data unit (SDU) reception interval.

32. The non-transitory computer-readable medium of claim 28, further comprising code for causing the computer to fragment, at the interworking node, a data packet received from the packet-switched terminal that exceeds the maximum packet size.

33. The method of claim 6, wherein generating the data packet in response to the received information comprises ignoring the maximum packet size if the capability to accommodate the maximum packet size is not supported by the packet-switched terminal.

34. The method of claim 1, wherein:
determining the maximum packet size for the video flow also includes determining a maximum packet size for an audio flow, and
the information sent from the interworking node to the packet-switched terminal also comprises a parameter indicating to the packet-switched terminal the maximum packet size, for the audio flow, that can be transmitted to the circuit-switched terminal without fragmenting, at the interworking node, data packets received from the packet-switched terminal.

35. The method of claim 1, wherein the information further comprises an indication of a type of the circuit-switched terminal with which the packet-switched terminal is communicating.

* * * * *